United States Patent [19]

Arbeniev et al.

[11] Patent Number: 4,872,760

[45] Date of Patent: Oct. 10, 1989

[54] METHOD AND APPARATUS FOR PROCESSING A MIX, PREFERABLY CONCRETE MIX

[75] Inventors: Alexandr S. Arbeniev; Alexandr A. Ignatiev, both of Vladimir; Vitaly A. Zhilin, Moscow; Alexandr S. Melnikov; Sergei F. Tomskikh, both of Vladimir, all of U.S.S.R.

[73] Assignee: Vladimirsky Politekhnichesky Institut Glavnoe Territorialone Upravlenie Po Stroitelstvu Vo, Vladimir, U.S.S.R.

[21] Appl. No.: 298,831

[22] Filed: Jan. 18, 1989

Related U.S. Application Data

[63] Continuation of Ser. No. 19,598, Feb. 26, 1987, abandoned.

[51] Int. Cl.$^4$ .......................... B28C 5/46; B01F 11/00; B01F 15/02; B01F 15/06
[52] U.S. Cl. ........................................ 366/7; 366/22; 366/53; 366/114; 366/146; 366/193
[58] Field of Search ....................... 366/31, 32, 1, 2, 9

[56] References Cited

U.S. PATENT DOCUMENTS

| | | | |
|---|---|---|---|
| 1,509,055 | 9/1924 | Payne | 366/22 |
| 2,054,253 | 9/1936 | Horsch | 366/6 X |
| 2,185,540 | 1/1940 | Cady | 366/118 |
| 2,710,744 | 6/1955 | Hensler | 366/24 |
| 3,156,812 | 11/1964 | Forman et al. | 219/388 |
| 3,158,441 | 3/1962 | Stevens | |
| 3,729,383 | 4/1973 | Goeldner | 138/43 X |
| 4,205,919 | 6/1980 | Attwell | 366/193 X |

FOREIGN PATENT DOCUMENTS

| | | | |
|---|---|---|---|
| 259672 | 5/1970 | U.S.S.R. | 366/23 |
| 874714 | 10/1981 | U.S.S.R. | |
| 1087496 | 4/1984 | U.S.S.R. | |

OTHER PUBLICATIONS

Vladimir, Information Leaflet, No. 206-84, Scientific Information Center, 12/1984.

Primary Examiner—Harvey C. Hornsby
Assistant Examiner—Scott J. Haugland
Attorney, Agent, or Firm—Burgess, Ryan and Wayne

[57] ABSTRACT

A method according to the invention involves continuously moving a mix within a closed vessel having loading and discharge pipes at the ends thereof. The mix is subjected to oscillations during movement by means of a source of oscillations. A gate is provided in the vessel upstream the discharge pipe for contolling the cross-sectional area of the flow path of the vessel and for defining a sealed zone in the vessel with the mix being processed. During movement, the mix is heated to 100° C. and above by passing electric current therein by means of an electrode installed in the vessel. Vapor is thus formed which penetrates the whole body of the mix so as to carry out uniform and rapid heating of all components of the mix.

12 Claims, 6 Drawing Sheets

METHOD AND APPARATUS FOR PROCESSING A MIX, PREFERABLY CONCRETE MIX

This application is a continuation, of application Serial No. 019,598, filed Feb. 26, 1987 now abandon.

FIELD OF THE ART

The invention relates to the construction industry, and more specifically, it deals with a method and apparatus for processing a mix, preferably concrete mix.

The invention may be used for heating various mortars, gas-filled calcium silicate mixes, bitumen, clay, frozen aggregates for concrete mix; for wet activation of cement; for continuous steaming of mineral materials such as gypsum; for rapid water-saturation of lightweight aggregates for concrete mix; for heating water, wine materials and any other fluid in the food and chemical industries.

The invention may be most advantageously used for processing mixes to be used in the manufacture of prefabricated and cast-in-place concrete and reinforced concrete structures, including those erected at low ambient temperatures.

BACKGROUND OF THE INVENTION

The heat factor is known to be decisive in the acceleration of concrete cure. Otherwise concrete would gain strength too slowly, especially in case of low ambient temperatures.

Various heating methods prevail among the existing methods of concrete heat treatment. These methods feature a long duration of heat treatment, considerable energy consumption and disruption of concrete structure because of thermal expansion of air and water vapour present in the concrete mix.

The evergrowing pace of modern construction calls for new, more efficient heat treatment methods contributing to an acceleration of concrete hardening and improvement of its quality, and the acute energy problem imposes more stringent requirements upon energy consumption, including energy consumption for heat treatment of concrete.

Known in the art is a method for processing concrete mix (cf. USSR Inventor's Certificate No. 1087496, Int.Cl. C 04 B41/30, publ. in Off. Bull. No. 15, 1984). This method comprises continuously moving the mix within a closed vessel, heating the mix during movement within a limited zone along the mixer by supplying steam from the outside. The mix is moved in the steam treatment zone at a velocity of 45–55 cm/s, the steam pressure being 0.7–1.0 kgf/cm$^2$.

An external heat source — steam is required for carrying out this method so that the heating control and provision of pre-set process parameters of hot concrete mix are rather complicated. The contact between the steam supply systems and concrete mix results in a rapid deposition of concrete mix on such systems so that efficiency and stability of operation of an apparatus carrying out the method decreases. The mix is caused to move by a screw driven by an electric motor so that total energy consumption for heat treatment of the mix by this method increases. In addition, when mix is heated to high temperatures, the mix sticks to the screw thus hampering the mix heating, movement and stirring.

Known in the art is a method for semicontinuous processing of gypsum (cf. Stevens Norbert J. Semicontinuous Material Treatment Process. Joy Manufacturing Co., U.S. Pat. No. 3158441, Cl. 23-123, filed Mar. 7, 1962, publ. Nov. 24, 1964).

This method is carried out in a calcination apparatus comprising a vertical cylinder vertically divided by rigid partitions into five compartments. The partitions have hollow guide members which also function as heat exchangers.

A vertical shaft extends through the central part of the cylinder to rotate it. Dihydrous gypsum is admitted through a top cone of the cylinder to the first compartment where water available in gypsum evaporates under the action of high temperature (260° C.). The process of evaporation from gypsum is carried out by heating the surface of heat exchangers through which hot oil circulates in any appropriate known manner.

The dried gypsum descends into the next compartment under pressure of steam formed in the compartment. Pressure in the first compartment drops to normal, and a new batch of gypsum gets to this compartment. In the second compartment, wherein temperature is about 325° C., gypsum is decomposed, the chemically bound water is removed, and an equilibrium vapour pressure is established. The calcination process is completed in the fifth (bottom) compartment.

Calcination of gypsum by this method is carried out under pressure of water vapour released from gypsum during calcination. Gypsum is calcined both directly by the surface of heat exchangers having a high temperature and owing to the temperature of phase conversion upon condensation of released vapour.

Further, all water available in gypsum turns into vapour and is collected in the upper zone of a respective compartment. The dried gypsum descends into the next compartment under the action of this vapour.

Heating devices, pipelines and control and measurement equipment are required for heating oil so that the apparatus for semicontinuous processing of gypsum is rather complicated as a whole and is explosion- and fire-hazardous. In addition, the apparatus for calcination of gypsum is rotated by a vertical shaft so that a special drive and additional energy consumption are required. The method is not continuous so that it cannot be regarded as suitable from the point of view of the up-to-date manufacturing requirements.

The use of this method and apparatus for preheating concrete mix is very difficult. The concrete mix heating time by this method will be too long since heating primarily occurs in the zones of direct contact between the mix and heat exchange surfaces, the adjacent layers being heated only through heat conductance of the liquid component of concrete mix (water). This will result in a high non-uniformity of temperature through the body of concrete mix. In addition, concrete mix will burn at the surface of heat exchangers. They will be rapidly covered with a crust of dry concrete so as to result in a high thermal resistance. First, this will prolong the heating time and then it will make the heating impossible.

Known in the art is an apparatus for continuous electrical heating of concrete mix (cf. USSR Inventor's Certificate No. 874714, Int.Cl. C 04 B 41/30; publ. in Off. Bull. No. 39, 1981). The apparatus comprises a vessel of open cross-section having loading and discharge pipes at the ends thereof. Electrically insulated plate electrodes are provided in the vessel. Each electrode is electrically connected to a voltage regulator.

The ratio of electrode length to height is 1.5–2:1. The apparatus also has one source of oscillations (a directional vibrator) mounted on the rear wall of the loading pipe.

The directional vibrator imparts to the vessel harmonic oscillations, and concrete mix available in the vessel will move along the electrodes. Alternating current is fed to the electrodes via the voltage regulators to pass through the concrete mix and heat it. This method makes it possible to create uniform electric and temperature field so as to avoid local overheating of the mix, boiling and moisture loss at the ends of the heating zone and underheating of the mix in the middle of this zone. Efficiency is 0.94–0.96, and the average heating temperature is increased to 95°–96° C.

However, free contact with the environment during heating of concrete mix results in heat losses from the mix through evaporation. This lowers efficiency of the apparatus in operation and increases energy consumption for mix heating.

Temperature gradient in the liquid phase of concrete mix, which comprises such components as water, binder and sand, is 12° C. over the cross-section of the apparatus. Only liquid phase has time to heat to 95°–98° C. in the zone directly adjacent to the last electrode. The time for heating concrete mix to an average temperature of 70°–80° C. per 1 m³ of the mix is the same as that in intermittent-action apparatuses. Therefore, the apparatus cannot ensure an improvement of throughput capacity in placing heated concrete mix. If the throughput capacity is increased, the average temperature of concrete mix heating decreases respectively which, in the end of the day, results in a lower concrete strength.

Known in the art is an apparatus for processing a mix, preferably concrete mix (cf. Information Leaflet No. 20684. Vladimir. Scientific Information Center, 1984). The apparatus comprises a closed vessel having loading and discharge pipes at the ends thereof. Three electrodes provided within the vessel coaxially therewith are secured to hinged non-sealed covers. The electrodes are connected to 380 V three-phase mains. A source of oscillations (vibrator) is installed on the vessel.

Concrete mix is continuously supplied to the loading pipe. Voltage is applied to the electrodes, and the vibrator is switched on. Under the action of oscillations, the concrete mix starts moving along the electrodes. Concrete mix being electrically conductive, it will short-circuit all three electrodes in succession and will be heated as ohmic resistance. Having passed through the heating zone, the mix will be fed into a mold or form through the discharge pipe.

In comparison with the apparatus disclosed in USSR Inventor's Certificate No. 874714, this apparatus ensures a better temperature uniformity of liquid phase of the mix, within 8°–10° C. This is due to the provision of a closed vessel. Evaporation of moisture from the concrete mix being heated occurs under the conditions of a limited free contact with outside air. The electrodes are not covered with concrete during operation as the continuously moving mix will clean the electrodes.

The electric power requirements are three times as low as compared with intermittent-action apparatuses having the same throughput capacity. With the same electric power consumption as in case of cyclical electric heating of the mix, the throughput capacity of the apparatus can be three times as great.

However, the absence of sealing of the inner space of the vessel, especially in the zone of direct heating of the concrete mix during its continuous movement, causes heat losses from the mix through evaporation.

As a result, efficiency of mix heating decreases thus requiring an additional energy consumption to make up for such heat losses. Further increase in concrete mix heating temperature is not possible since the interior of the apparatus permanently communicates with the environment during continuous movement of the mix being heated so that maximum temperature of concrete mix cannot be above 100° C., and it is impossible to intensify concrete mix heating by increasing temperature of liquid phase.

The main object of the invention is to provide a method and apparatus for processing a mix, preferably concrete mix which make it possible to intensify mix temperature increase.

Another, not least important object of the invention is to provide a method and apparatus for processing a mix, preferably concrete mix which allow electrical energy consumption for mix processing to be lowered.

These and other objects are accomplished by the provision of a method for processing a mix, preferably concrete mix, comprising continuously moving the mix within a closed vessel, heating the mix during movement by causing electric current to flow therein and subjecting the mix to the action of oscillations, wherein, according to the invention, a sealed zone is created in the vessel, the mix being heated to 100° C. and above in this zone, vapour, which is formed, penetrating the whole body of the mix to carry out uniform and rapid heating of all components of the mix.

The method according to the invention makes it possible to carry out a rapid, easy and economical heating of concrete mix to 100° C. and above without using any external sources of heat and pressure, with the employment of the most widely available and efficient energy source — electricity.

Electric energy turns to thermal energy during continuous movement of the mix within the sealed zone and directly within the body thereof. Expanded air and vapour released from the mix being heated build-up gauge pressure in the sealed zone so that the electrical heating might be continued to 100° C. and above. The resultant vapour, owing to its low viscosity and high kinetic energy, rapidly and deeply penetrates all micropores of aggregates of the concrete mix and gets to grains of cement to be condensed therein and give up heat so as to heat them. Better penetration of water to cement grains results in an improved activity of cement hydration. Combining direct heating of the mix with the phase transformation heat which is released upon condensation of the resultant vapour makes it possible to combine advantages of the two methods of concrete mix heating: steaming and electrical heating. This results in a more rapid mix temperature rise so as to improve throughput capacity of continuous mix heating plants and lower electric energy consumption. Vibratory stirring occurring concurrently with the mix heating contributes to uniform distribution of all mix components over the entire volume which will improve structural uniformity of concrete. Therefore this method intensifies mix heating and raises final mix temperature after the heating. At the same time, an increase in the heat capacity of the mix contributes to an accelerated hardening of concrete, hence, to shorter time of erection of structures and installations.

Concrete mix is preferably subjected to deaeration and turbulization after heating to 100° C. and above.

This facility provides for air removal from the heated mix and improves uniformity of the mix temperature before placing it into a mold or form.

Air presence in concrete mix is known to lower strength of concrete members and structures. Reduction of air content in concrete mix contributes to an increase in concrete density and strength and improvement of surface finish of members and structures, which is without pores and cavities.

Turbulization of the mix before placing into a mold or form results in destruction of cement grains swallen as a result of hydration so as to remove therefrom "screening films" and to provide for free access of mixing water to the active surface of cement. This results in a deeper hydration of cement grains and, finally, in a more intense growth of concrete strength. In addition, as a result of turbulization of the mix before placing, high uniformity of liquid phase temperature in the mix is ensured, which is within $\pm 2°-3°$ C. and, since turbulization materially intensifies heat exchange between components of the mix, heating of coarse aggregate of the mix is also accelerated. This is favourable for subsequent hardening of the placed concrete because the temperature uniformity of the mix ensures uniform distribution of strength in the concrete of a member or structure.

The problem on which the invention is based is also solved by providing an apparatus for carrying out the method for processing a mix, preferably concrete mix, comprising a closed vessel having loading and discharge pipes at the ends thereof, at least one electrode within the vessel, and at least one source of oscillations, wherein, according to the invention, a gate is provided in the vessel upstream the discharge pipe for controlling the cross-sectional area of the flow path of the vessel.

The provision of the gate makes it possible to completely fill the vessel with the mix and to create a sealed zone therein. As a result, the mix can be heated to 100° C. and above owing to the transformation of electrical energy to heat energy and owing to the phase transformation heat upon condensation of vapour released from the mix being heated. Heating the mix to 100° C. and above makes it possible to intensify mix heating and reduce electric energy consumption.

A shutter is preferably provided at the outlet of the discharge pipe to define with the gate a chamber for deaeration and turbulization of the mix, the shutter being mounted for controlling the cross-sectional area of the flow path of the chamber.

One of the functions of the chamber for deaeration and turbulization of the mix is to remove air available in the heated mix, the presence of the air being detrimental to concrete strength.

Another function of the chamber is to turbulize the heated mix before placing. This improves temperature uniformity of the mix, hence, ensures uniform distribution of strength in the concrete of a member or structure during hardening.

Simplicity of the chamber design and combining it in one and the same apparatus with the vessel in which continuous treatment of the mix occurs make it possible to perform the whole complex of production operations at one point (adjacent to the point of concrete mix placing) simultaneously. This ensures high efficiency of the plant, makes it possible to intensify the mix temperature rise and lowers electric energy consumption.

The gate preferably comprises two series-mounted plates of which one plate, which is closer to the vessel, is mounted for controlling the cross-sectional area of the flow path of the vessel and the other plate is rigidly secured and has a curvilinear central portion having a convexity facing towards the loading pipe and ports located in the lower part of the plate substantially adjacent to the side walls of the vessel, the shutter being made in the form of two series-mounted plates of which one plate, which is closer to the gate, is mounted for controlling the cross-sectional area of the flow path of the chamber and the other plate is rigidly secured and has a concavity facing towards the loading pipe and a port located in the lower part of the plate, in the middle thereof, the area of this port being smaller than, or equal to the total area of the gate ports.

The provision of the rigidly secured plate of the gate which is so constructed contributes to splitting of the mix flow in two and also to the cleaning of the surface of this portion of the gate by the moving mix. The controllable plate is necessary for shutting-off the cross-sectional area of the flow path of the vessel for its complete filling with the mix and for creating the sealed zone at the beginning of heating. Under steady mix heating conditions the controllable plate is normally set above the ports and retained in this position. It is also possible to vary the area of the ports during mix heating by means of the controllable plate, hence to vary throughput capacity of plant and temperature of mix heating. After the two streams of the mix have passed through the gate, they move to the chamber wherein the mix is deaerated and turbulized.

The provision of the rigidly secured plate of the shutter which is so constructed makes it possible to carry out turbulization of the mix before placing it into a mold or form since the two streams of the heated mix formed by the gate will pass through the chamber to hit against a barrier in their path, i.e. against the rigidly secured plate of the shutter so that they will abruptly change the direction of movement to intersect each other thus turbulizing the mix as a whole. The heated mix will then escape through one common port located in the lower part of the rigidly secured plate, in the middle thereof. As a result, high uniformity of temperature of liquid phase of the mix before placing into a mold or form is ensured, within $\pm 2°-3°$ C.

The area of the port of the rigidly secured plate of the shutter should be smaller than, or equal to the total area of the ports of the rigidly secured plate of the gate. This facility provides for free escape of the heated mix from the chamber without the risk of a dead zone being formed therein. Failure to comply with this requirement would result in an interruption of mix placing into a mold or form, and a plug may form in the vessel thus causing an interruption of the mix heating process and requiring cleaning of the interior of the vessel to remove hardened mix from the chamber.

Curvilinear portions having a concavity facing towards the loading pipe are preferably provided in either side of the central curvilinear portion of the rigidly secured plate of the gate.

This facility provides for a better passage of the heated mix through the ports of the gate since formation of dead zones of the mix adjacent to the gate is completely eliminated. Therefore, the gate ports will not be clogged with concrete.

The gate is preferably made in the form of two series-mounted plates of which one plate, which is closer to the vessel, is mounted for controlling the cross-sectional area of the flow path of the vessel and the other plate is rigidly secured and has a concavity facing towards the vessel and a port located in the lower part of the plate, in the middle thereof, the shutter being made in the form of two series-mounted plates of which one plate, which is closer to the gate, is mounted for controlling the cross-sectional area of the flow path of the chamber and the other plate is rigidly secured and has a curvilinear central portion having a convexity facing towards the chamber and ports located in the lower part of the plate substantially adjacent to the side walls of the chamber, the area of the ports being smaller than, or equal to the area of the gate port.

The provision of the rigidly secured plate which has a concavity facing towards the vessel and the port located in the lower part of the plate, in the middle thereof, makes it possible to concentrate the flow of heated mix at the central portion of the gate thus ruling out formation of dead zones upstream the gate and contributing to cleaning of the surfaces of the gate with the moving mix. The controlled plate is necessary for shutting-off the cross-section of the flow path of the vessel so as to completely fill it with mix and create the sealed zone at the beginning of heating. Under steady heating conditions the controlled plate is normally set above the ports and retained in this position. The area of the gate ports can also be varied during mix heating by means of the controlled plate so as to control throughput capacity of the plant and mix heating temperature. After the passage through the gate the mix stream is fed to the chamber for deaeration of the mix and its turbulization.

The provision of the rigidly secured plate of the shutter which is so constructed makes it possible to carry out effective turbulization of mix before placing it into a mold or form since the resultant stream of heated mix that passes through the chamber would hit against a barrier in the form of the rigidly secured plate of the shutter in its path to be split into two independent streams. At the same time, this portion of the shutter is cleaned by the moving mix. The resultant two streams will hit against the chamber walls and will then pass through the ports in the lower part of the plate which are located substantially adjacent to the side walls of the chamber. Thus each stream and the mix as a whole are turbulized before placing into a mold or form. As a result, high uniformity of temperature in the liquid phase of the mix within ±2°–3° C. is ensured before placing into a mold or form. The effect of the ports of the shutter having the area which is smaller than, or equal to the area of the gate port is similar to that described for the abovementioned embodiment.

Curvilinear portions having a concavity facing towards the loading pipe are preferably provided on either side of the central curvilinear portion of the rigidly secured plate of the shutter.

This facility ensures a better passage of the mix through the ports of the shutter since the possibility of formation of dead zones of the mix adjacent to the shutter is completely eliminated. Hence, there will be no clogging of shutter ports with concrete.

The gate and shutter in the apparatus for processing a mix, preferably concrete mix preferably have self-closing valves mounted on the rigidly secured plates of the gate and shutter, respectively.

The provision of the self-closing valves ensures their reliable and permanent intimate contact with the surface of the moving mix under any fluctuations of the mix level in the vessel and chamber so as to protect the interior space of the vessel and chamber against penetration of outside air, hence against heat losses from the heated mix. In addition, the use of the self-closing valve on the shutter ensures removal of only air from the mix when it passes along the chamber. There will be no moisture evaporation nor heat loss from the chamber since temperature in the chamber and in the mix will be one and the same under steady conditions of operation of the apparatus.

Therefore, the use of the method and apparatus for processing a mix, preferably concrete mix according to the invention makes it possible to intensify mix temperature rise and lower electric energy consumption.

BRIEF DESCRIPTION OF THE DRAWINGS

The invention will now be described in detail with reference to specific embodiments illustrated in the accompanying drawings, in which.

DETAILED DESCRIPTION OF THE INVENTION

A method for processing concrete mix according to the invention comprises continuously moving the mix within a closed vessel (FIG. 1) and creating a sealed zone therein. During the movement, the mix is heated by causing electric current to flow therein and is subjected to oscillations. The mix, which is present in the sealed zone, is heated to 100° C. and above. Vapour is thus formed which penetrates the mix through the entire thickness of the mix to carry out uniform and rapid heating of all components of the mix.

The method according to the invention will be described in greater detail below with reference to a specific embodiment of an apparatus for carrying out the method according to the invention.

An apparatus for carrying out the method according to the invention, which is constructed according to the invention, comprises a vessel 1 (FIGS. 1 and 2) with a closed cross-section of the flow path having at the ends thereof a loading pipe 2 and a discharge pipe 3. Three electrodes 4 are provided within the vessel. The number of the electrodes may be any and depends on structural embodiment of the vessel 1, particular features of the process of electric heating of concrete mix, electrode connection circuit configuration, type of supply mains and other factors. In this embodiment, the electrodes 4 are connected to a respective phase line 5 of a-c three-phase 380/220 V mains, and the vessel 1 is connected to a neutral line 6.

Figure 3:
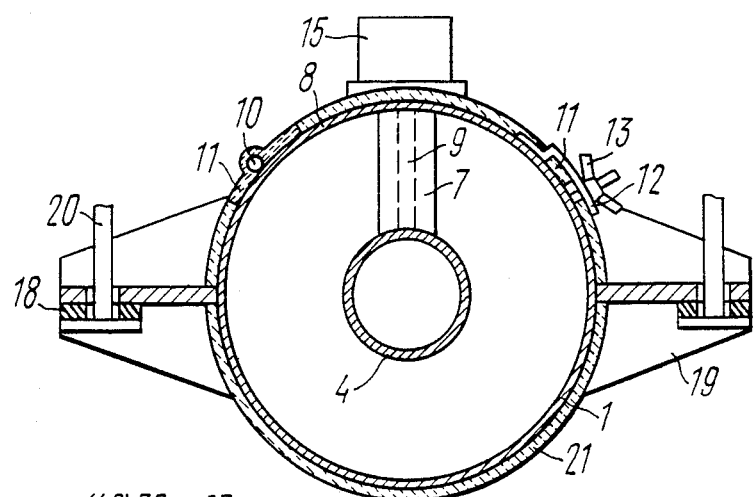
FIG. 3 is an enlarged sectional view taken along line III—III in FIG. 2.

The electrodes 4 are mounted coaxially within the vessel 1 and are electrically insulated therefrom by means of sleeves 7 (FIG. 3). The electrodes 4 are rigidly secured to sealed hinged covers 8 by means of holders 9 and can be easily removed from the vessel 1 for cleaning or replacement.

The covers 8 are mounted by means of hinges 10. The covers 8 are sealed by means of gaskets 11. The covers 8 are retained in the proper position by means of a strap 12 and fasteners 13. The points of connection of holders 9 of the electrodes 4 to electric supply cables 14 (FIG. 1) are closed against exposure to external factors by means of protective caps 15 (FIG. 3).

Figure 1:
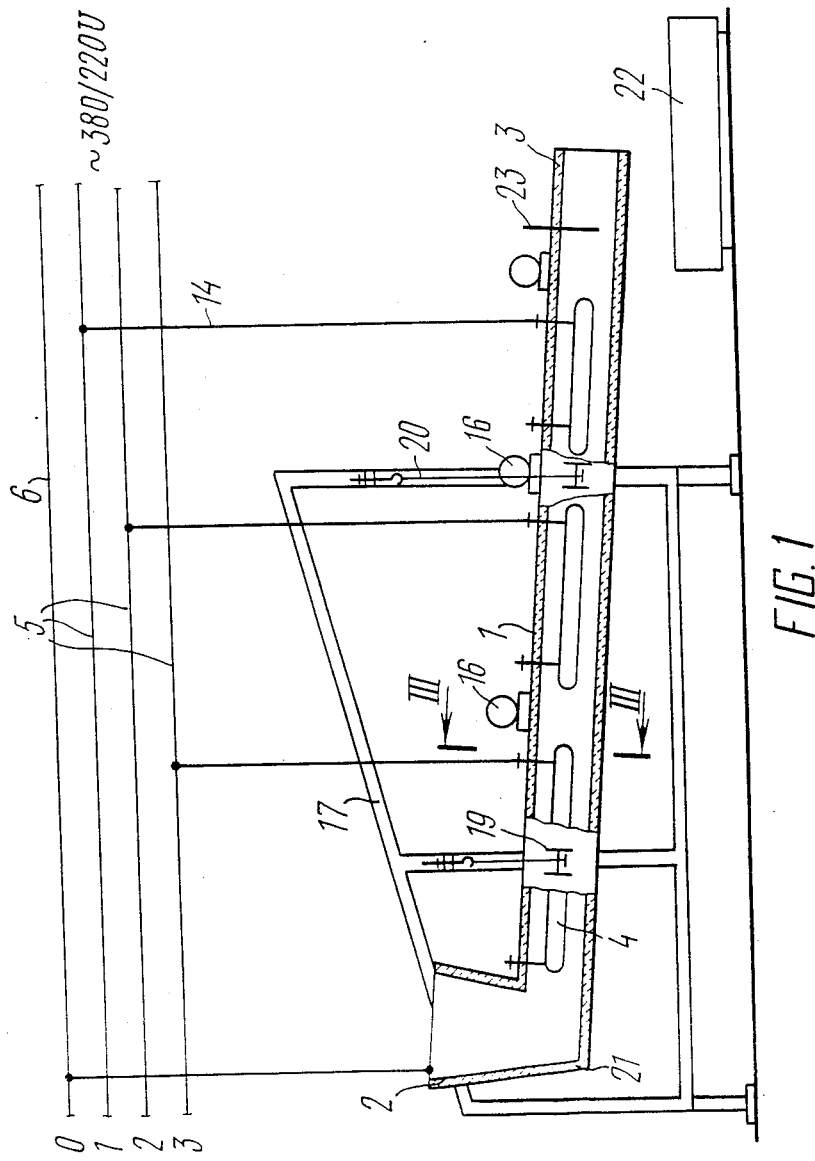
FIG. 1 schematically shows an apparatus according to the invention.
Figure 2:
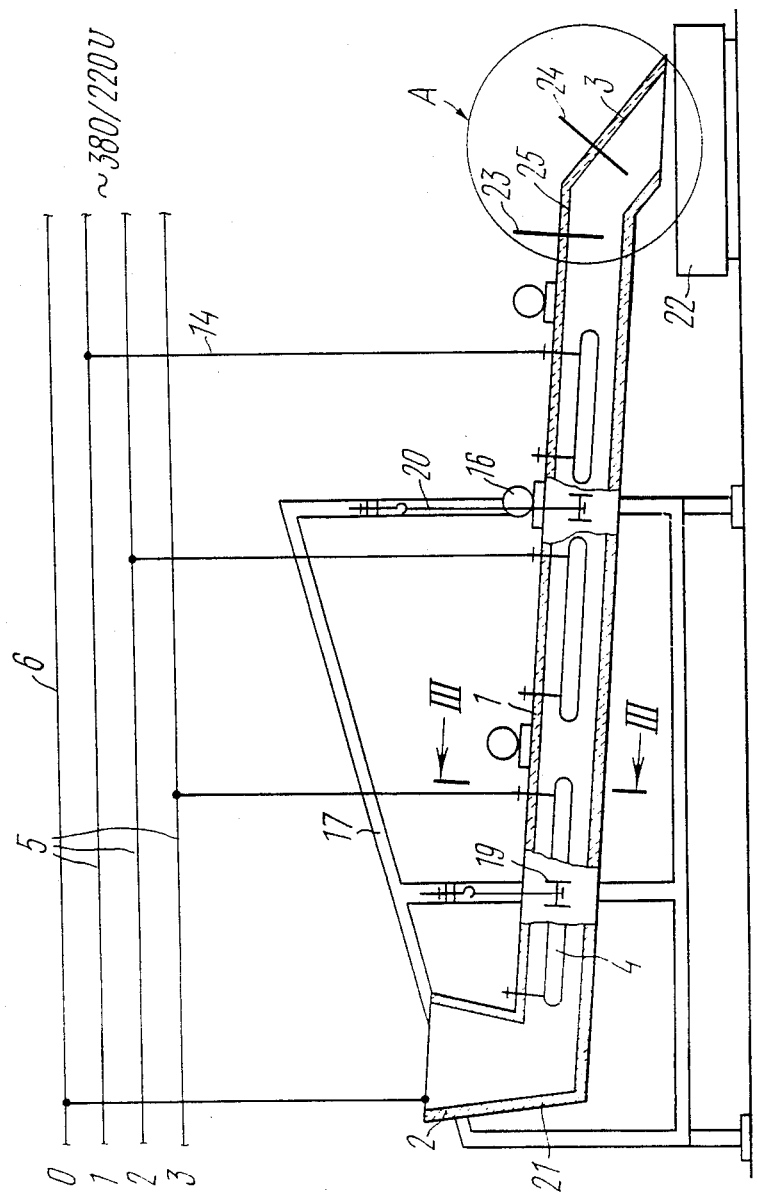
FIG. 2 is the same apparatus according to the invention, shown with a chamber.

Three sources of oscillations: vibrators 16 are installed on the vessel 1 (FIGS. 1,2). The number and type of the vibrators, their connection circuit configuration and operating pattern may be of any type appropriate for a given application. These parameters are determined in accordance with a specific application: provision for a certain timing of operation of the vibrators 16, characteristics of concrete mix and other factors.

The vibrators 16 may be installed at any point of the apparatus. In this embodiment, the vibrators 16 are mounted on the surface of the vessel 1 in a spaced relationship to, and behind one another.

The apparatus for continuous processing of concrete mix is suspended from a stationary frame 17 through the intermediary of elastic shock-absorbers (FIG. 3) which are mounted on supports 19 of the vessel 1, by means of suspensions 20.

The vessel 1 is externally electrically- and heat-insulated, e.g. with a layer 21 of foamed polyurethane.

The amount of concrete mix being heated placed into a mold 22 is controlled by means of a gate 23 provided in the vessel 1 upstream the discharge pipe 2, which is adapted to vary the cross-sectional area of the flow path of the vessel 1 so as to create therein a sealed zone together with the mix.

The cross-sectional area of the flow path of the vessel may be controlled by any appropriate known means.

In this embodiment, the discharge pipe 3 (FIG. 2) is in the form of a bent arcuated towards the discharge side.

A shutter 24 is provided at the outlet of the discharge pipe 3 to define with the gate 23 a chamber 25 for deaeration and turbulization of the mix. The shutter 24 is mounted for controlling the cross-sectional area of the flow path of the chamber 25. The cross-sectional area of the flow path of the chamber 25 may varied by any appropriate known means.

For most effective deaeration and turbulization, the gate 23 and shutter 24 have a special design.

FIGS. 4, 5, 6 and 7 show an embodiment in which the gate 23 (FIG. 4) is in the form of two series-mounted plates. The plate 26 (FIG. 5), which is closer to the discharge pipe 3, is rigidly secured and has a central curvilinear portion having a convexity facing towards the discharge pipe 3. Ports 27 (FIG. 6) are provided in the lower part of the plate 26 substantially adjacent to the side walls of the vessel 1.

Figure 4:
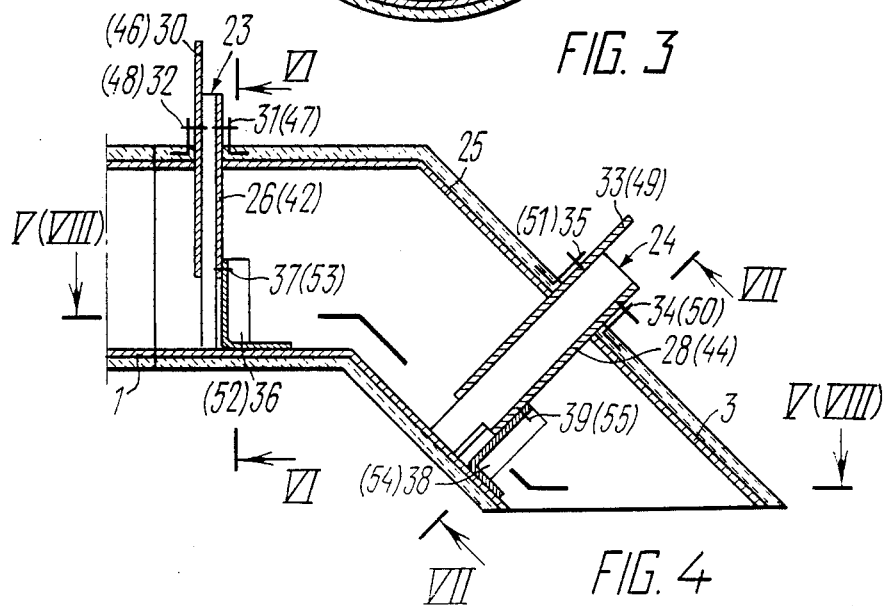
FIG. 4 is an enlarged detail A in FIG. 2.

Curvilinear portions having a concavity facing towards the loading pipe 2 are provided on either side of the central curvilinear portion of the rigidly secured plate 26 (FIG. 5) of the gate 23 (FIG. 4).

The shutter 24 in this embodiment is made in the form of two series-mounted plates. The plate 28 (FIG. 5), which is closer to the discharge pipe 3, is rigidly secured and has a concavity facing towards the discharge pipe 3. A port 29 (FIG. 7) is made in the lower part of the plate 28, in the middle thereof. The area of the port 29 in this embodiment is equal to the total area of the ports 27 (FIG. 6) of the gate 23 (FIG. 4). In another embodiment, the area of the port 29 (FIG. 7) may be smaller than the total area of the ports 27 (FIG. 6) of the gate 23 (FIG. 4).

The plate 30 (FIG. 5) of the gate 23 (FIG. 4), which is closer to the vessel 1, is mounted for varying the cross-sectional area of the flow path of the vessel 1 (the controllable plate 30).

The rigidly secured plate 26 (FIG. 5) of the gate 23 (FIG. 4) is inserted into special slots (not shown) of the vessel 1, lowered to the bottom of the vessel 1 and secured to the chamber 25 by fasteners 31.

When it is necessary to change size of the ports 27 (FIG. 6) or even completely close them (for complete filling of the vessel 1 with the mix), the controllable plate 30 (FIG. 5) of the gate 23 (FIG. 4) is secured in any desired position using fasteners 32.

The plate 33 (FIG. 5) of the shutter 24 (FIG. 4), which is closer to the gate 23, is mounted for varying the cross-sectional area of the flow path of the chamber 25 (the controllable plate 33).

The rigidly secured plate 28 (FIG. 5) of the shutter 24 (FIG. 4) is inserted into special slots (not shown in the drawings) of the chamber 25, lowered to the bottom of the chamber 25 and secured to the discharge pipe 3 by means of fasteners 34.

When it is necessary to change size of the port 29 (FIG. 7) or even completely close it, the controllable plate 33 (FIG. 5) of the shutter 24 (FIG. 4) is secured in any desired position by fasteners 35.

The ports 27 (FIG. 6) of the rigidly secured plate 26 (FIG. 5) of the gate 23 (FIG. 4) are completely covered by an elastic self-closing valve 36 (FIG. 5), e.g. of thin rubber. The valve 36 is made with a margin overlapping the perimeter of the chamber 25 and intimately engages its walls. The valve 36 is rigidly secured to the plate 26 by fasteners 37 (FIG. 4).

The port 29 (FIG. 7) of the rigidly secured plate 28 (FIG. 5) of the shutter 24 (FIG. 4) is completely covered by an elastic self-closing valve 38 (FIG. 5), e.g. of thin rubber. The valve 38 is made with a margin overlapping the perimeter of the discharge pipe 3 and intimately engages its walls. The valve 38 is rigidly secured to the plate 28 by fasteners 39 (FIG. 4).

Figure 8:
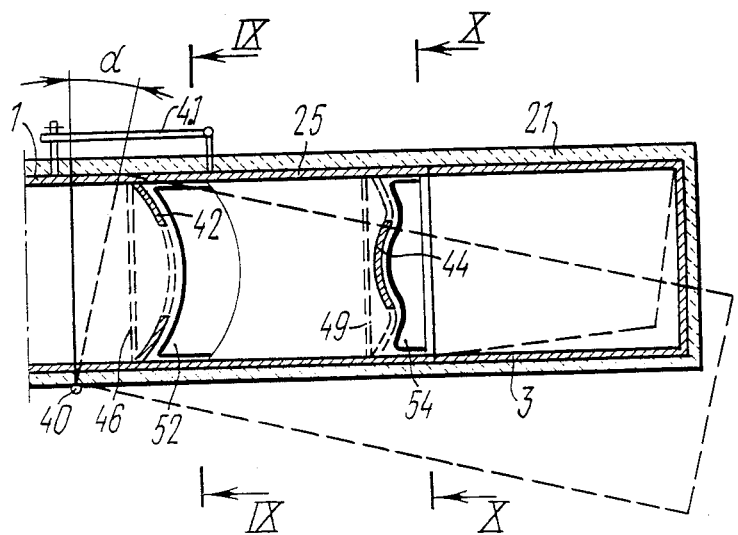
FIG. 8 is a sectional view taken along line VIII-—VIII in FIG. 4 showing another embodiment of the gate and shutter.

To facilitate cleaning of the vessel 1 (FIG. 8) and also to allow preventive inspection or repairs, the discharge pipe 3 is made rotatable, in this case, in the direction towards the vessel 1. Rotation of the pipe 3 may be enabled by means of a hinge 40 (FIG. 8). The pipe 3 is secured to the vessel 1 when in the working position by means of fasteners 41. Angle $\alpha$ (FIGS. 5 and 8) is the angle of rotation of the pipe 3 with respect to the vessel 1. In this embodiment, the range of variation of the angle $\alpha$ is from 0° to 180° C.

FIGS. 4, 8, 9 and 10 show another embodiment in which the gate 23 (FIG. 4) is made in the form of two series-mounted plates. The plate 42 (FIG. 8), which is closer to the discharge pipe 3, is rigidly secured and has a concavity facing towards the vessel 1. A port 43 (FIG. 9) is made in the lower part of the plate 42, in the middle thereof. The shutter 24 (FIG. 4) is made in the form of two series-mounted plates. The plate 44, which is closer to the discharge pipe 3 (FIG. 8), is rigidly secured and has a central curvilinear portion having a convexity facing towards the chamber 25. Ports 45 are made in the lower part of the plate 44 substantially adjacent to the side walls of the chamber 25 (FIG. 10), the total area of the ports 45 being equal to the area of the port 43 (FIG. 9) of the gate 23 (FIG. 4). In another embodiment, the total area of the ports 45 (FIG. 10) may be smaller than the area of the port 43 (FIG. 9) of the gate 23 (FIG. 4).

Curvilinear portions having a concavity facing towards the chamber 25 (FIG. 8) are provided on either side of the central curvilinear portion of the rigidly secured plate 44 (FIG. 8) of the shutter 24 (FIG. 4).

The plate 46 of the gate 23 (FIG. 4), which is closer to the vessel 1, is mounted for varying the cross-sectional area of the flow path of the vessel 1 (the controllable plate 46).

The rigidly secured plate 42 (FIG. 8) of the gate 23 (FIG. 4) is inserted into special slots of the vessel 1 (not shown in the drawings), lowered to the bottom of the vessel and secured to the chamber 25 by fasteners 47.

When it is necessary to change size of the port 43 (FIG. 9) or to close it completely (for complete filling of the vessel 1 with the mix), the controllable plate 46 (FIG. 8) of the gate 23 (FIG. 4) is secured in any desired position by fasteners 48.

The plate 49 (FIG. 8) of the shutter 24 (FIG. 4), which is closer to the gate 23, is mounted for varying the cross-sectional area of the chamber 25 (the controllable plate 49).

The rigidly secured plate 44 (FIG. 8) of the shutter 24 (FIG. 4) is inserted into special slots of the chamber 25 (not shown in the drawings), lowered to the bottom of the chamber 25 and secured to the discharge pipe 3 by fasteners 50 (FIG. 4).

When it is desired to change size of the ports 45 or even close them completely, the controllable plate 49 (FIG. 8) of the shutter 24 (FIG. 4) is secured in any desired position by fasteners 51.

The port 43 (FIG. 9) of the rigidly secured plate 42 (FIG. 8) of the gate 23 (FIG. 4) is completely covered by an elastic self-closing valve 52 (FIG. 8), e.g. of thin rubber. The valve 52 is made with a margin to overlap the perimeter of the chamber 25 and intimately engages its walls. The valve 52 is rigidly secured to the plate 42 by fasteners 53 (FIG. 4).

The ports 45 (FIG. 10) of the rigidly secured plate 44 (FIG. 8) of the shutter 24 (FIG. 4) are completely covered by an elastic self-closing valve 54 (FIG. 8), e.g. of thin rubber. The valve 54 is made with a margin to overlap the perimeter of the discharge pipe 3 and intimately engages its walls. The valve 54 is rigidly secured to the plate 44 by fasteners 55 (FIG. 4).

The apparatus functions in the following manner.

Concrete mix is first fed to the loading pipe 2 of the vessel 1, the vessel being of a closed cross-sectional configuration. The mix is then caused to move forward within the vessel 1 using oscillation sources - vibrators 16. The mix moving along the vessel 1 hits against the gate 23 and defines a sealed zone within the vessel. At the same time, voltage is applied to the electrodes 4 mounted in the vessel 1 and connected to three-phase mains 5. During movement along the electrodes 4, the mix, which functions as conductor, is directly heated with current while being stirred. With temperature increase the amount of gaseous phase in the mix being heated, which is in the form of air and vapour mixture, suddenly increases. As evaporation of one litre of water releases 1500–2000 l of vapour, evaporation of even a small volume of water within the mix under sealed conditions will result in building-up of internal gauge pressure.

The resultant vapour, owing to its low viscosity and high kinetic energy, will rapidly and deeply penetrate all micropores of concrete mix aggregates and get to cement grains to be condensed there and give-up heat to heat them. The favourable direction of movement of the resultant vapour — transversely with respect to the mix flow contributes to a rapid heating of aggregates in the concrete mix.

All this makes it possible to heat the mix to 100° C. and above.

Therefore, heating of the mix is effected simultaneously both with electricity at the expense of Joule heat, and using the phase transformation heat upon condensation of vapour released from the mix. Temperature of the mix of 100° C. and above is achieved during a very short period, from several seconds to several minutes, depending on voltage value, electric conductivity of the mix and other factors. Under steady conditions and with the cross-section of the flow path of the vessel 1 completely filled with the mix the vessel 1 is completely sealed.

During movement along the electrodes 4, the mix is heated, vibrated to activate it, and homogenized. Owing to the continuous and intensive movement of the mix and effective heat exchange between various components of the mix, high degree of temperature uniformity of the liquid phase of the mix over the vessel cross-section, within ±4°–5° C. is ensured.

In addition, owing to the continuous movement of the mix formation of a film of dried mix on the electrode surface and formation of a screening film of air and vapour mixture thereon are eliminated.

The provision of the self-closing valve 36(52) mounted on the rigidly secured plate 26(42) of the gate 23 ensures permanent contact between the gate 23 and the surface of the moving mix under any fluctuations of the mix level in the vessel 1. This guarantees sealing of the interior space of the vessel 1 against penetration of air from outside in case of fluctuations of the mix level in the vessel 1, hence maximum possible reduction of heat losses from the vessel 1 into the environment through the gate 23.

After heating of the mix in the vessel 1, the mix moves to the chamber 25 defined by the gate 23 and shutter 24. The mix is subjected to deaeration and turbulization in this chamber before placing it into the mold or form 22.

During movement through the chamber 25, the layer of heated mix, which is thinner, moves at a lower velocity as compared to the mix in the vessel 1, and starts intensively give-up air available in the layer. This is due to the fact that a zone of reduced air pressure is created above the surface of any moving flow of liquid or mix. Consequently, during the passage of the heated mix through the chamber 25 the substantial part of air available in the mix is removed into the interior space of the chamber 25. This process intensifies the action of oscillation sources 16 through the walls of the chamber 25 upon the mix.

The use of the self-closing valve 38(54) mounted on the rigidly secured plate 28(44) of the shutter 24 reliably protects the interior space of the chamber 25 against penetration of air from the outside even under fluctuations of the mix level in the chamber 25, hence, heat losses through the shutter 24 into the environment are reduced to the maximum possible extent. Under steady operating conditions of the apparatus, there is substantially no evaporation of moisture from the mix in the chamber 25 since temperature within the chamber and in the mix passing therethrough is substantially the same, and only air is released from the mix. As pressure grows in the chamber 25 because of air release from the mix, the valve 38(54) is easily bent, air from the chamber 25 escapes outside, pressure in the chamber becomes equal to the pressure in the environment, and the valve 38(54) returns to its initial position, Deaeration makes it possible to remove air available in the heated mix. This contributes to an improved concrete strength as 1% reduction of entrained air content in the mix results in up to 5% improvement of concrete strength.

In addition, turbulization of the mix immediately before placing occurs in the chamber 25. This provides for a minimum temperature gradient in the placed mix, hence a more uniform distribution of concrete strength in members and structures.

Figure 5:
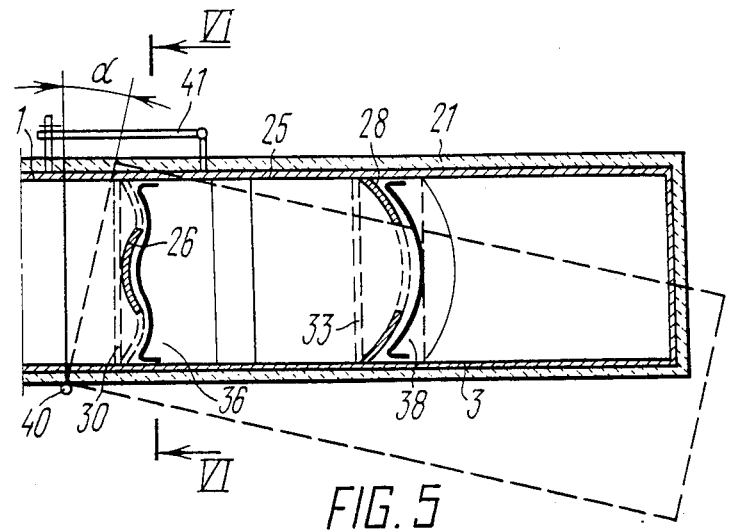
FIG. 5 is a sectional view taken along line V—V in FIG. 4 showing one embodiment of a gate and shutter.
Figure 6:
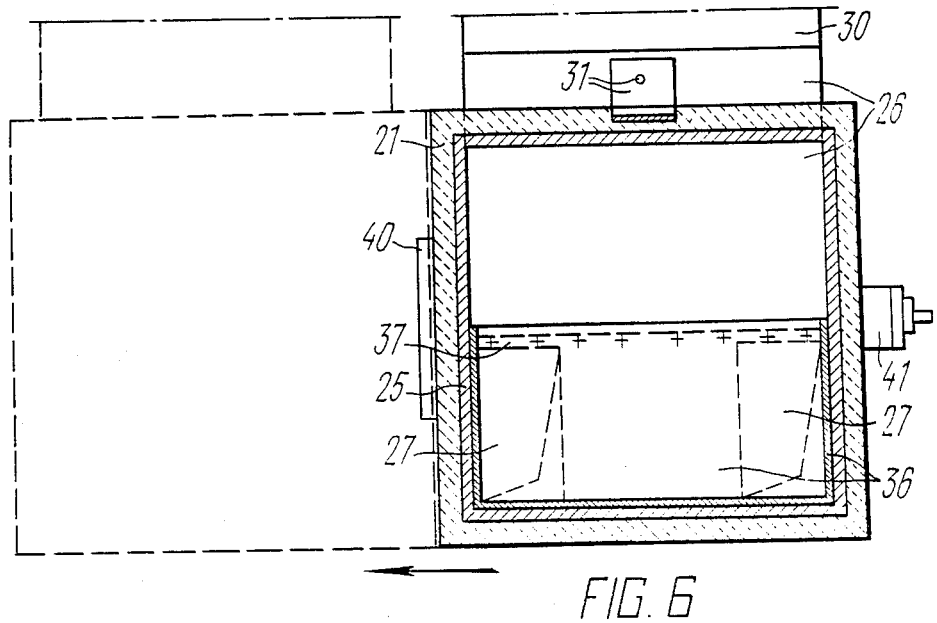
FIG. 6 is a sectional view taken along line VI—VI in FIG. 4 showing the same embodiment of the gate and shutter.
Figure 7:
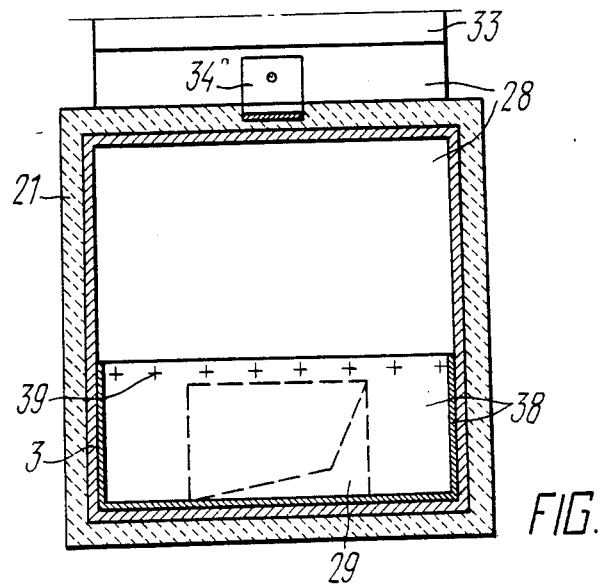
FIG. 7 is a sectional view taken along line VII—VII in FIG. 4, showing the same embodiment of the gate and shutter.

If the chamber 25 is defined by the gate 23 shown in FIGS. 4, 5 and 7, the gate 23 forms two streams of the heated mix which, after the passage through the chamber 25, would hit energetically against the shutter, and the resultant jets would intersect one another to turbulize the flow of the mix as a whole before placing into the mold or form 22. As a result, high temperature uniformity of liquid phase of the mix within ±2°-3° C. is achieved before placing into the mold or form 22.

Figure 9:
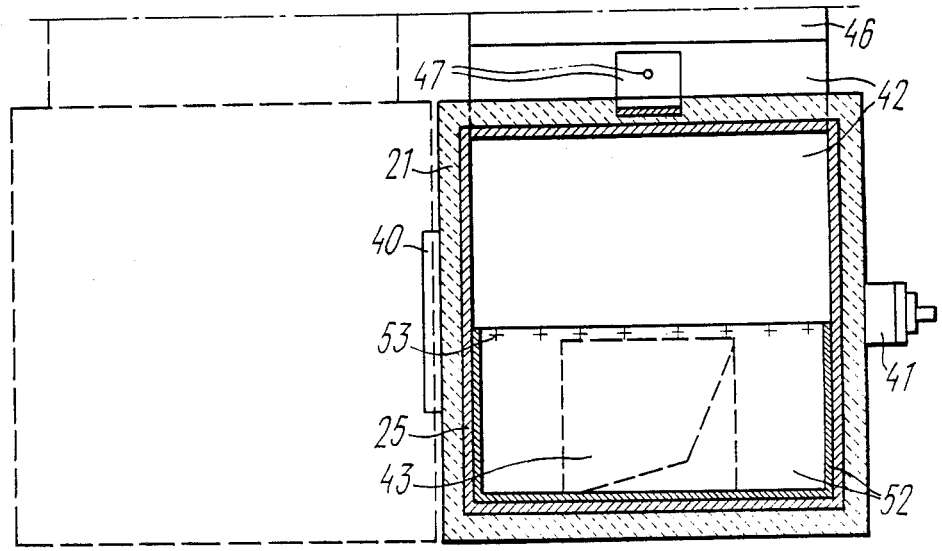
FIG. 9 is a sectional view taken along line IX—IX in FIG. 8.
Figure 10:
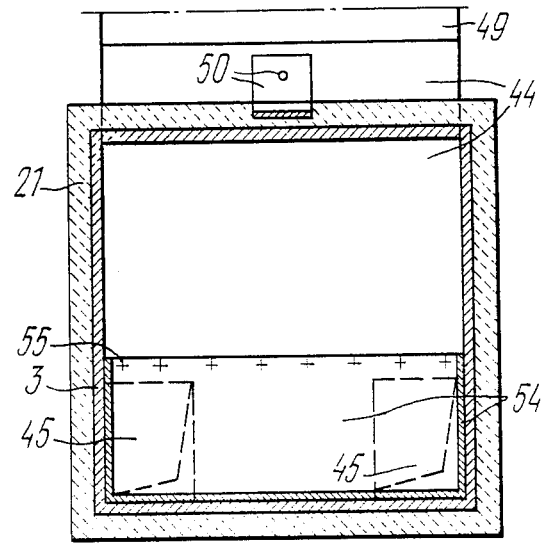
FIG. 10 is a sectional view taken along line X—X in FIG. 8.

When the chamber 25 is defined by the gate 23 shown in FIGS. 4, 8 and 9 and by the shutter 24 shown in FIGS. 4, 8 and 10, the gate 23 forms a single jet of the heated mix which, after the passage through the chamber 25, would hit energetically against the shutter 24 to be split into two jets which would hit against the walls of the chamber 25 and escape turbulized through the two ports 45 of the shutter 24.

As a result high temperature uniformity of liquid phase of the mix within ±2°-3° C. before placing into the mold or form 22 is also achieved.

Therefore, the use of the method and apparatus for processing a mix, preferably concrete mix according to the invention makes it possible to intensify process of temperature rise and lower electric energy consumption.

EXAMPLE

Concrete mix with a cone slump of 13–15 cm (for obtaining concrete strength of 200 kgf/cm²) had the following composition in kg/m³ (dry components):
binder:sand:crushed stone:water=320:665:1050:195.

The binder was Portland cement with the expected cement stone strength of 400 kgf/cm² at the age of 28 days. Average activity of Portland cement after steaming for 24 hours was 310 kgf/cm². Sand had a particle size from 0.14 to 1.2 mm. Crushed stone was of limestone, with a particle size from 10 to 45 mm.

The concrete mix was processed in the apparatus for carrying out the method according to the invention.

The results characterizing efficiency of the method and apparatus according to the invention are given below in Table 1.

TABLE 1

| Parameters of continuous processing of concrete mix | |
|---|---|
| Parameter | Value |
| 1. Current at electrodes, I | 267 A |
| 2. Phase voltage at electrodes, $U_{ph}$. | 220 V |

TABLE 1-continued

| Parameters of continuous processing of concrete mix | |
|---|---|
| Parameter | Value |
| 3. Initial mix temperature, $t_{in}$. | 18° C. |
| 4. Average ohmic resistance during mix heating, $\rho$ | 5.24 Ω m |
| 5. Mix heating time, $T_h$ | 2.11 minutes |
| 6. Maximum temperature of mixing water, $t_{max}$ | 116° C. |
| 7. Average temperature of heated mix, $t_{av}$ | 66.5° C. |
| 8. Specific electric energy consumption, $W_{sp}$ | 37.4 kWh/m³ |
| 9. Power input, $P_e$ | 173 kW |
| 10. Throughput capacity, C | 5.0 m³/h |

In this case the use of the apparatus for carrying out the method according to the invention (for heating concrete mix) made it possible to achieve the mixing water temperature above 100° C., namely 116° C. This cut down the time of heating concrete mix by 11–12%. Elimanation of water evaporation during heating of concrete mix made it possible to save 2% more electric energy. As a result, the total improvement of productivity of the process of heat treatment of concrete mix amounted to 13–14%.

With the use of this method for heat treatment of other mixes in which a greater fraction of the total heat capacity of the system belongs to water or other highly heat absorbing electrically conducting liquid the efficiency of heat treatment will be still higher.

What we claim is:

1. A method for processing a mix, comprising:
    causing the mix to move continuously within an elongated vessel having an inlet end and an outlet end so that said vessel is completely filled;
    subjecting said mix to the action of oscillations during said movement;
    defining a sealed zone within the vessel during said movement of said mix by sealing said inlet end and said outlet end;
    heating at least a portion of said mix to at least 100° C. by causing electric current to flow in the mix during said movement of said mix within said sealed zone, whereby vapour is formed which penetrates the whole body of said mix to carry out rapid heating of all components of said mix.

2. An apparatus for processing a mix, comprising:
    an elongated vessel for continuous movement of a mix being processed therein, said vessel having an inlet end which is sealed by said mix when said vessel is completely filled therewith and an outlet end;
    a pipe for loading the mix provided at the inlet end of said vessel;
    a pipe for discharging the mix provided at the outlet end of said vessel;
    at least one electrode provided within said vessel and designed for heating said mix;
    at least one source of oscillations adapted to act upon said mix being processed; and
    a gate for controlling the cross-sectional area of the flow path of said vessel provided in said vessel upstream said pipe for discharging said mix in said vessel a sealed zone whereby a pressure is created in the mix by vapors liberated from the mix being heated.

3. An apparatus according to claim 2, wherein a shutter is provided at the outlet end of said vessel for discharging said mix so as to define with said gate a chamber for deaeration and turbulization of said mix, said shutter being mounted for controlling the cross-sectional area of the flow path of said chamber.

4. An apparatus for processing a mix, comprising:
an elongated vessel for continuous movement of a mix being processed therein, said vessel having an inlet end and an outlet end;
a pipe for loading the mix provided at the inlet end of said vessel;
a pipe for discharging the mix provided at the outlet end of said vessel;
at least one electrode provided within said vessel and designed for heating said mix;
at least one source of oscillations adapted to act upon said mix being processed;
a gate for controlling the cross-sectional area of the flow path of said vessel provided in said vessel upstream said pipe for discharging said mix and designed for defining with said mix in said vessel a sealed zone whereby a pressure is created in the mix by vapors liberated from the mix being heated;
a shutter at the outlet of said pipe for discharging said mix so as to define with said gate a chamber for deaeration and turbulization of said mix, said shutter being mounted for controlling the cross-sectional area of the flow path of said chamber;
said gate comprising two series-mounted plates of which one plate, which is closer to said vessel, is designed for controlling the cross-sectional area of the flow path of said vessel and the other plate is rigidly secured to the vessel and has a central curvilinear position having a convexity facing toward said pipe for loading the mix and ports in the lower part of the plate located substantially adjacent to side walls of said vessel; and
said shutter is made in the form of two series-mounted plates of which one plate, which is closer to said gate, is designed for controlling the cross-sectional area of the flow path of the chamber and the other plate is rigidly secured to the pipe for discharging the mix and has a concavity facing towards the pipe for loading the mix and a port in the lower part of the plate, in the middle thereof, the area of the port being smaller than, or equal to, the total area of the ports of said gate.

5. An apparatus according to claim 4, wherein curvilinear portions having a concavity facing towards said pipe for loading the mix are provided on either side of the central curvilinear portion of the rigidly secured plate of said gate.

6. An apparatus for processing a mix, comprising:
an elongated vessel for continuous movement of a mix being processed therein, said vessel having an inlet end and an outlet end;
a pipe for loading the mix provided at the inlet end of said vessel;
a pipe for discharging the mix provided at the outlet end of said vessel;
at least one electrode provided within said vessel and designed for heating said mix;
at least one source of oscillations adapted to act upon said mix being processed;
a gate for controlling the cross-sectional area of the flow path of said vessel provided in said vessel upstream said pipe for discharging said mix and designed for defining with said mix in said vessel a sealed zone whereby a pressure is created in the mix by vapours liberated from the mix being heated, said gate being made in the form of two series-mounted plates of which one plate, which is closer to said vessel, is designed for controlling the cross-sectional area of the flow path of said vessel and the other plate is rigidly secured and has a concavity facing towards said vessel and a port located in the lower part of the plate, in the middle thereof; and
a shutter comprising two series-mounted plates of which one plate, which is closer to said gate, is designed for controlling the cross-sectional area of the flow path of the chamber and the other plate is rigidly secured and has a central curvilinear portion having a convexity facing towards the chamber and ports located in the lower part of the plate substantially adjacent to the side walls of the chamber, the area of the ports being smaller than, or equal to, the area of the port of said gate.

7. An apparatus according to claim 6, wherein curvilinear portions having a concavity facing towards the chamber are provided on either side of the central curvilinear portion of the rigidly secured plate of said shutter.

8. An apparatus according to claim 4, wherein said gate and shutter have self-closing valves provided on respective rigidly secured plates of said gate and shutter, respectively.

9. An apparatus according to claim 6, wherein said gate and shutter have self-closing valves provided on respective rigidly secured plates of said gate and shutter, respectively.

10. An apparatus for processing a mix, comprising:
an elongated vessel for continuous movement of a mix being processed therein, said vessel having an inlet end and an outlet end;
a pipe for loading the mix provided at the inlet end of said vessel;
a pipe for discharging the mix provided at the outlet end of said vessel;
at least one electrode provided within said vessel and designed for heating said mix;
at least one source of oscillations adapted to act upon said mix being processed;
a gate for controlling the cross-sectional area of the flow path of said vessel provided in said vessel upstream said pipe for discharging said mix and designed for defining with said mix in said vessel a sealed zone whereby a pressure is created in the mix by vapours liberated from the mix being heated,
said gate being made in the form of two series-mounted plates of which one plate, which is closer to said vessel, is designed for controlling the cross-sectional area of the flow path of said vessel and the other plate is rigidly secured and has a concavity facing towards said vessel and a port located in the lower part of the plate, in the middle thereof; and
a shutter at the outlet of said pipe for discharging said mix so as to define with said gate a chamber for deaeration and turbulization of said mix, said shutter being mounted for controlling the cross-sectional area of the flow path of said chamber,
said shutter comprising two series-mounted plates of which one plate, which is closer to said gate, is designed for controlling the cross-sectional area of the flow path of the chamber and the other plate is rigidly secured and has a central curvilinear portion having a convexity facing towards the chamber and ports located in the lower part of the plate substantially adjacent to the side walls of the chamber, the area of the ports being smaller than, or equal to, the area of the port of said gate.

11. An apparatus according to claim 10, wherein curvilinear portions have a concavity facing towards the chamber and are provided on either side of the central curvilinear portion of the rigidly secured plate of said shutter.

12. An apparatus according to claim 10, wherein said gate and shutter have self-closing valves provided on respective rigidly secured plates of said gate and shutter, respectively.

* * * * *